(12) United States Patent
Makoto et al.

(10) Patent No.: US 7,697,238 B2
(45) Date of Patent: Apr. 13, 2010

(54) MAGNETIC DISK DRIVE WITH LOAD/UNLOAD MECHANISM HAVING FIRST AND SECOND PROTRUSIONS

(75) Inventors: Ohno Makoto, Kanagawa (JP); Shin Nagahiro, Kanagawa (JP); Atsushi Katsuta, Kanagawa (JP); Gentarou Nakamura, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 957 days.

(21) Appl. No.: 11/479,321

(22) Filed: Jun. 30, 2006

(65) Prior Publication Data

US 2007/0008653 A1    Jan. 11, 2007

(30) Foreign Application Priority Data

Jul. 5, 2005    (JP)    ............................. 2005-195818

(51) Int. Cl.
    *G11B 5/54*    (2006.01)
(52) U.S. Cl. .................................... 360/254.3
(58) Field of Classification Search .............. 360/254.3, 360/254.4, 254.5, 254.6, 255.2, 255.3, 255.4, 360/255.5
    See application file for complete search history.

(56) References Cited

U.S. PATENT DOCUMENTS

| | | | | |
|---|---|---|---|---|
| 5,148,339 A | * | 9/1992 | Yoshida | 360/254.7 |
| 5,550,695 A | * | 8/1996 | Matsumoto | 360/254.4 |
| 5,764,437 A | | 6/1998 | Meyer et al. | |
| 5,870,255 A | * | 2/1999 | Hornung et al. | 360/254.4 |
| 6,449,128 B1 | | 9/2002 | Abe | |
| 6,473,268 B2 | | 10/2002 | Simozato | |
| 6,480,361 B1 | | 11/2002 | Patterson | |

FOREIGN PATENT DOCUMENTS

| | | |
|---|---|---|
| JP | 05-334823 | 12/1993 |
| JP | 08-129840 | 5/1996 |
| JP | 08-161842 | 6/1996 |
| JP | 11-096707 | 4/1999 |
| JP | 2000-076811 | 3/2000 |
| JP | 2002093090 A * | 3/2002 |

OTHER PUBLICATIONS

Chinese Office Action for Application No. 200610100733.8, dated Oct. 17, 2008, 11 pages total.

* cited by examiner

*Primary Examiner*—Craig A. Renner
(74) *Attorney, Agent, or Firm*—Townsend and Townsend and Crew LLP; John Henkhaus

(57) ABSTRACT

In one embodiment, a disk drive has a solenoid and spring for turning a ramp mechanism about a rotating shaft. When the drive operates, since the ramp mechanism moves out from the magnetic disk by the force of the solenoid, the outer peripheral edge of a magnetic head that has formerly been unusable can be used as a data read/write region, without the magnetic head interfering with the fins of the ramp mechanism. During a non-operating state of the drive and in case of a power interruption, the force of the spring returns the ramp mechanism to a position at which the magnetic head can be unloaded. This construction allows the storage capacity of the drive to be easily increased without sacrificing the shock resistance of the ramp mechanism.

13 Claims, 5 Drawing Sheets

MAGNETIC DISK DRIVE WITH LOAD/UNLOAD MECHANISM HAVING FIRST AND SECOND PROTRUSIONS

CROSS-REFERENCES TO RELATED APPLICATIONS

This application claims priority from Japanese Patent Application No. JP 2005-195818, filed Jul. 5, 2005, the entire disclosure of which is incorporated herein by reference.

BACKGROUND OF THE INVENTION

The present invention relates to magnetic disk drives, and more particularly to a magnetic disk drive having a load/unload mechanism for a magnetic head.

In recent years, the proliferation of personal computers bestowed with portability has been increasing and smaller-size and larger-capacity magnetic disk drives mounted in these computers have come to be most commonly used. In addition to these tendencies, the enhancement of recording capacity and the improvement of shock resistance are being demanded each year. During non-operating time, conventional drives have moved their magnetic heads to specially surface-treated areas at the inner circumferential portion of associated disks to prevent the heads from adhering to the disks. The application of a shock, however, has resulted in a collision between the disk and the head, thus damaging both the disk and the head, and adversely affecting the reliability of the drive.

The prevailing drives in recent years, therefore, incorporate a ramp mechanism for moving out the head from the disk. When the drive is not to be operated, the ramp mechanism moves out the head from the disk in order to avoid a disk-to-head collision and improve the life and reliability of the drive as a result.

Such a compact magnetic disk drive has come to encounter the problem of a failure due to the application of a shock. Accordingly, magnetic disk drives have increasingly adopted, as one means of enhancing anti-shock performance, a load/unload mechanism by which a slider with a magnetic head mounted thereon is unloaded from a magnetic disk when data is not to be read therefrom or written thereto. Among these magnetic disk drives, the ones employing a ramp load scheme are prevailing, and this scheme has the advantages that it can be realized without introducing significant modifications into a conventional magnetic disk drive, and that costs can be minimized. An example of such a magnetic disk drive of the ramp load scheme is described in Patent Reference 1 (Japanese Patent Laid-Open No. Hei 11-96707). Also, Patent Reference 2 (Japanese Patent Laid-Open No. 2000-76811) describes a ramp load mechanism that includes a ramp provided outside a magnetic disk, and a tab extending from the front end of a loading member which applies a load to a head, wherein the tab can be engaged with the ramp. This tab is disposed in offset form with respect to the central axis of a head support member and at the outer peripheral edge of the magnetic disk, over the head support member. Thus, since the ramp is miniaturized and since a suspension is structurally divided into the head support member and the loading member, the magnetic head can be loaded/unloaded without rolling the head support member or the magnetic head, even if a rolling moment occurs to the loading member.

BRIEF SUMMARY OF THE INVENTION

As described in Patent Reference 1, part of the ramp usually overlaps the magnetic disk at an outer peripheral section thereof to allow the magnetic head to be loaded onto/unloaded from the magnetic disk. The overlapping section is where the magnetic head cannot be moved forward or backward, so this section cannot be used to read/write data and becomes an area unusable as a recording surface. The outer peripheral section of the magnetic disk is long in circumferential dimension and is thus greater than the inner peripheral section of the magnetic disk in terms of area relative to the same unloading width for the head. For these reasons, the outer peripheral section of the magnetic disk is among the items to be improved to meet the market needs for increased storage capacities. Although the ramp described in Patent Reference 2 is provided outside the disk, since a tab extends from the front end of a loading member and is offset from the center of a head support member, substantial modification of the current product is required and the possible deformation of the loading member cannot be denied.

A feature of the present invention is to provide a magnetic disk drive having a ramp mechanism capable of expanding a read/write region of a magnetic disk without sacrificing shock resistance.

In one aspect, the present invention has a solenoid and spring for turning the ramp mechanism about a rotating shaft thereof. During the operation of the drive, the ramp mechanism moves out from a magnetic disk by the force of the solenoid. Thus, since a magnetic head does not interfere with the ramp member of the ramp mechanism, the outer peripheral edge of the magnetic disk that has formerly been unusable can be used as a data read/write region. During a non-operating state of the drive and in the event of a power interruption, the force of the spring returns the ramp mechanism to a position at which the magnetic head can be unloaded. This construction allows a storage capacity to be easily increased without sacrificing the shock resistance of the ramp mechanism.

According to the present invention, it is possible to provide a magnetic disk drive having a ramp mechanism capable of expanding a read/write region of a magnetic disk without sacrificing shock resistance.

DETAILED DESCRIPTION OF THE INVENTION

Figure 1:
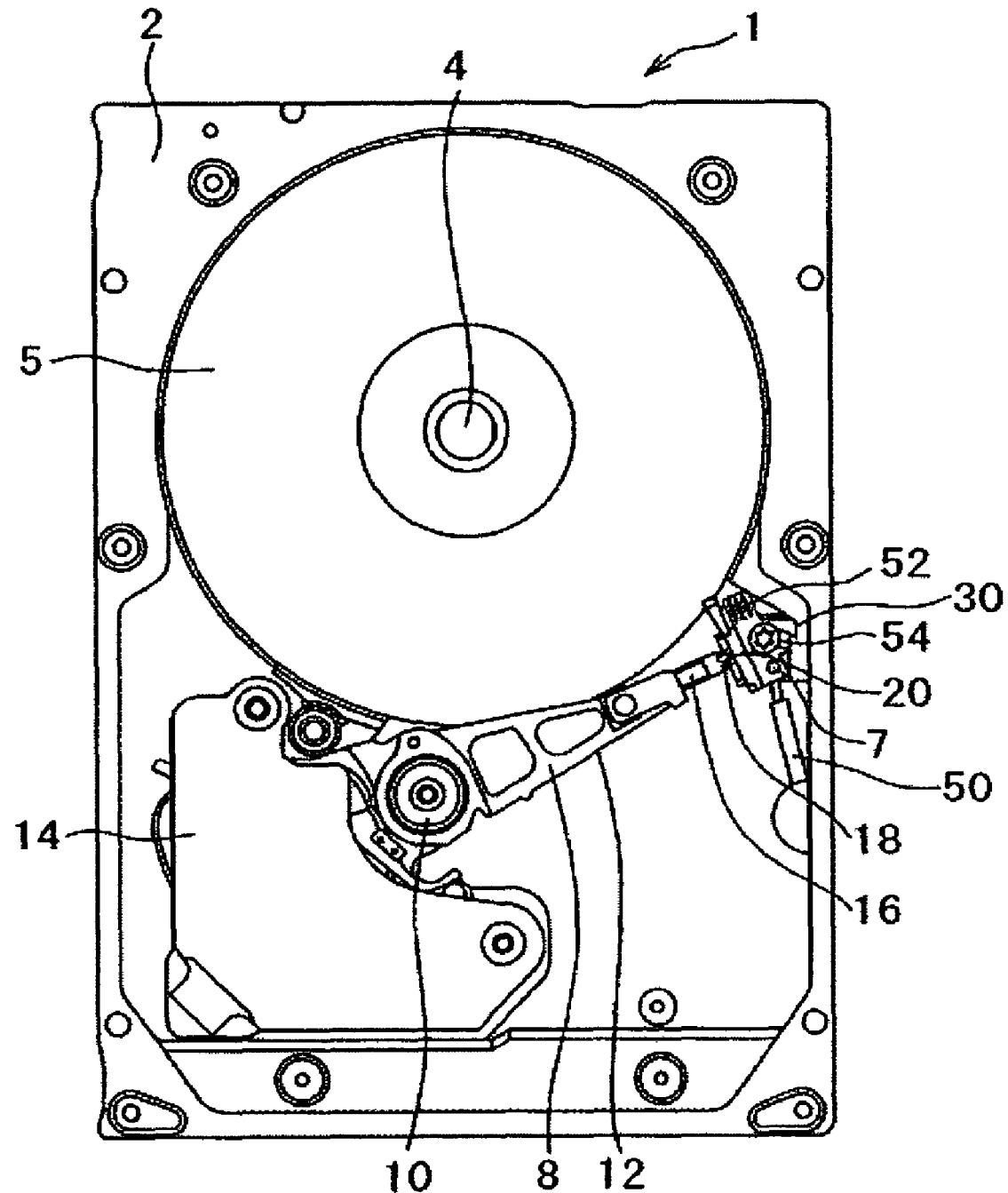
FIG. 1 is a plan view showing a schematic configuration of a magnetic disk drive according to an embodiment of the present invention.

An embodiment of the present invention will be described below referring to the accompanying drawings. FIG. 1 is a plan view showing a schematic configuration of a magnetic disk drive. A magnetic disk drive 1 includes a base 2, a spindle motor 4 secured to the base 2, and a carriage 8. The spindle motor 4 has at least one magnetic disk 5, and the carriage 8 is constructed of a head arm 12 that turns about a pivot 10, and a voice coil motor (VCM) 14. One end of a suspension 16 is mounted on the head arm 12, and a magnetic head 18 is mounted at the other end of the suspension 16 via a flexure.

The suspension 16 has a lift tab 20 whose front end is extended. Near an outer peripheral edge of the magnetic disk 5 on the base 2, a ramp mechanism 30 that constitutes a load/unload mechanism is pivotally supported by a rotating shaft 7 secured to the base 2. A driving element (solenoid) 50 for turning the ramp mechanism 30 and moving it out from the magnetic disk 5 is also secured to the base 2, on which is mounted an end of a spring 52 which returns ramp 30 to its original position (load/unload position) when the solenoid 50 becomes de-energized. The force that the solenoid 50 generates is set to be equal to or greater than force of the spring 52. In addition, a guide member 54 that serves as a guide for the ramp mechanism 30 to turn and prevents vertical shifting of the ramp mechanism 30 is secured to the base 2. In the thus-constructed magnetic disk drive 1, when an electric current is supplied to the VCM 14, the carriage 8 starts pivotally moving about the pivot 10 and the magnetic head 18 mounted on the suspension 16 is located to an arbitrary position in a radial direction of the magnetic disk 5. Data is thus read or written.

Figure 2:
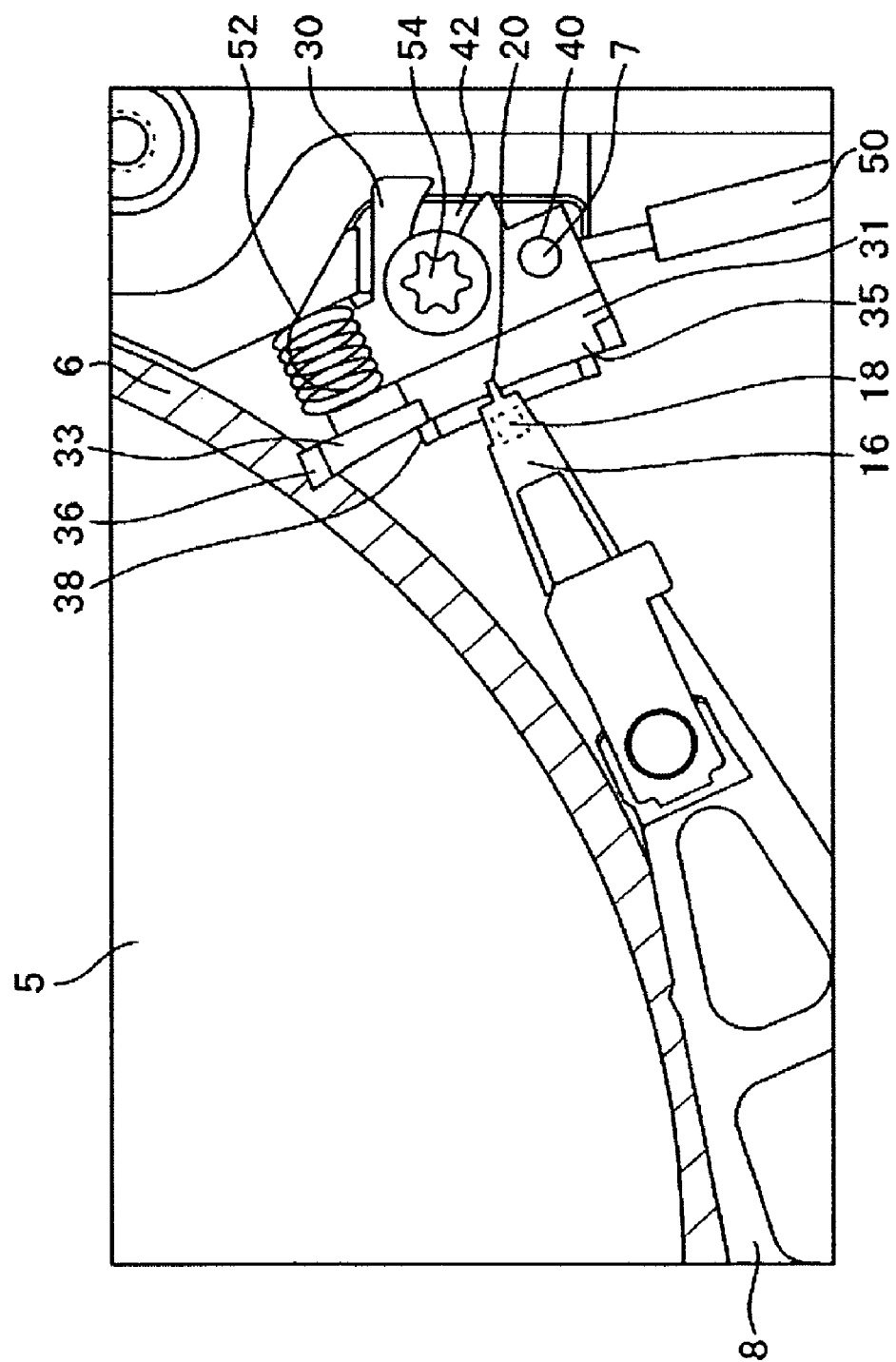
FIG. 2 is a partially enlarged view of FIG. 1, showing the relationship between a ramp mechanism and a lift tab during a non-operating state of the drive.
Figure 4:
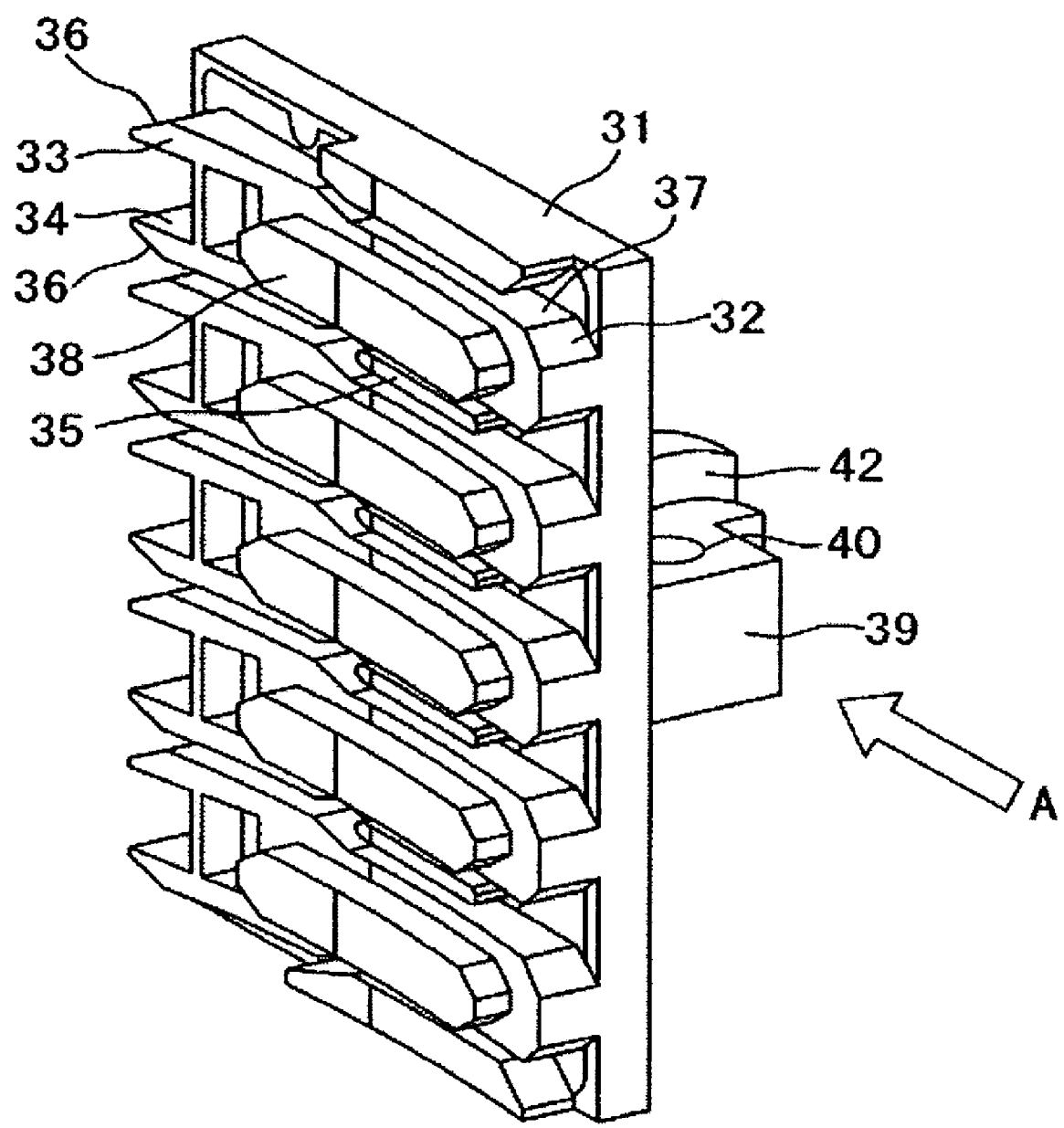
FIG. 4 is a perspective view of the ramp mechanism.

FIG. 2 is a plan view showing in enlarged form the relationship established between the ramp mechanism 30 and the lift tab 20 when the magnetic head 18 is unloaded. FIG. 4 is a perspective view showing a configuration of the ramp mechanism 30. The ramp mechanism 30 includes a support 31, a protruding section 32 that protrudes from the support 31, and a tab constraint plate 35. The protruding section 32 has a ramp member that extends toward the magnetic disk 5 (the ramp member includes an upper fin 33 and a lower fin 34). The lift tab 20 of the suspension 16 associated with an upper face of the magnetic disk 5 uses an upper face of the upper fin 33, and the lift tab 20 of the suspension 16 associated with a lower face of the magnetic disk 5 uses a lower face of the lower fin 34. The upper face of the upper fin 33 and the lower face of the lower fin 34 each have a load/unload guide surface (inclined surface) 36 formed at respective front ends. An unload guide surface 37 following the inclined surface 36 is formed at each protruding section 32, and these constituent elements are provided in symmetrical form on horizontal planes.

Both upper and lower faces of the protruding section 32 have the same shape and are also the same in function. Only the upper face of the protruding section 32 is therefore described below. The tab constraint plate 35 is formed at an upper position of the unload guide surface 37, in parallel thereto, and has a function that limits vibration amplitude of the lift tab 20 at the front end of the suspension when an external shock is applied. In the vicinity of the unload guide surface, the support 31 of the ramp mechanism 30 further has a flexure constraint plate 38 that protrudes from the protruding section 32. As with the tab constraint plate 35, the flexure constraint plate 38 has a function that limits flexure vibration amplitude of the suspension 16 which vibrates in a direction longitudinal with respect to the magnetic disk surface in such cases as where an external shock is applied. A second protruding section 39 protrudes at the reverse side of the support 31, and a hole 40 for insertion of the rotating shaft 7 and a guide groove 42 guided by a guide member 54 are formed in the protruding section 39.

When the magnetic head 18 is to be unloaded, the solenoid 50 is de-energized, then the ramp mechanism 30 is turned about the rotating shaft 7 by the force of the spring 52, and the inclined surfaces 36 at the upper fin 33 and the lower fin 34 are fixed to a position at which the inclined surfaces overlap the outer peripheral edge of the magnetic disk 5. Control of the carriage 8 causes the lift tab 20 to climb the inclined surface 36 and unloads the magnetic head 18 from the magnetic disk surface. When the carriage 8 advances to where it abuts on an outer diametral stopper, the lift tab 20 is moved to a position of the unload guide surface 37 and stopped at this position. Consequently, even if an external shock is applied during a non-operating state of the magnetic disk drive 1, the magnetic head 18 that has been unloaded onto the ramp mechanism 30 does not collide with the magnetic disk 5. This prevents the magnetic head 18 and the magnetic disk 5 from being damaged and suppresses any impacts on a disk drive failure.

Figure 3:
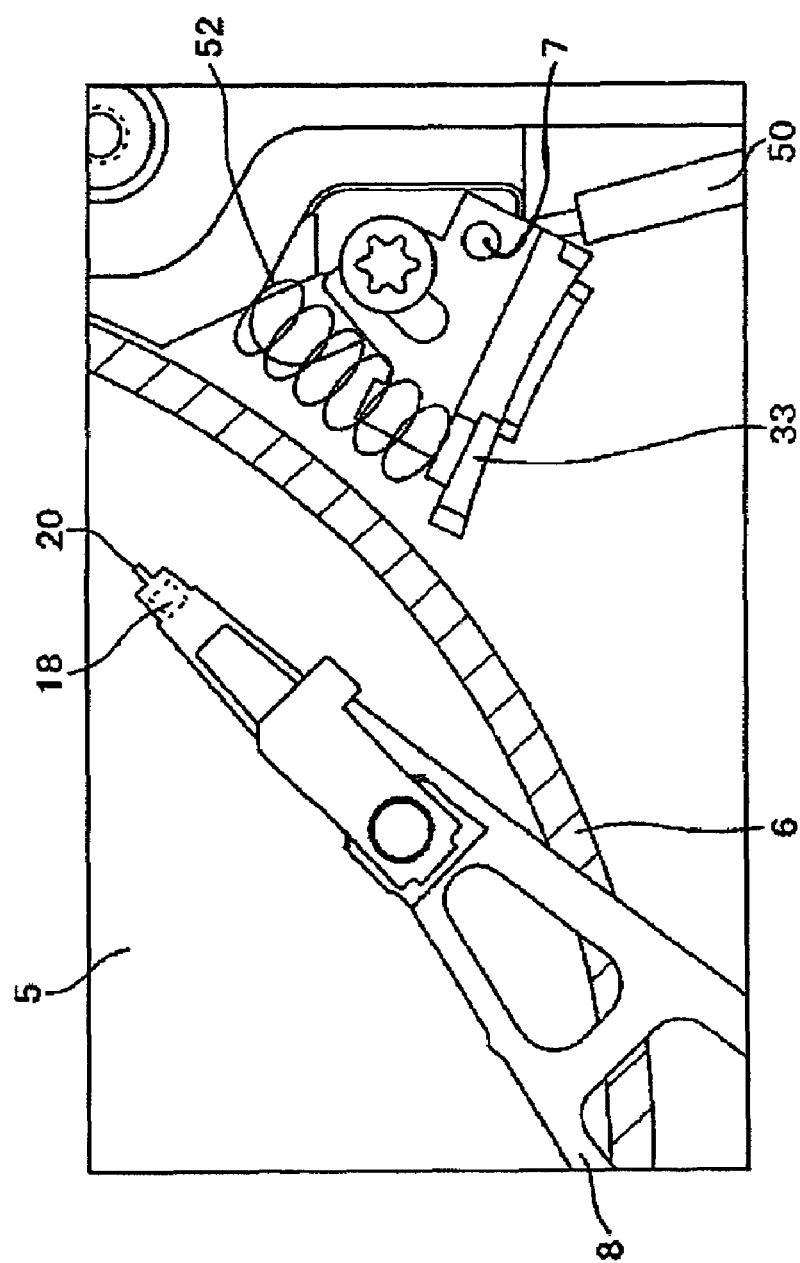
FIG. 3 is a partially enlarged view of FIG. 1, showing the relationship between the ramp mechanism and the lift tab during an operating state of the drive.

During operation of the drive, as shown in FIG. 3, the magnetic head 18 moves above the surface of the magnetic disk 5. At this time, the drive energizes the solenoid 50, turns the ramp mechanism 30 against the force of the spring 52, and moves the upper fin 33 and the lower fin 34 to a position at which the fins do not overlap the magnetic disk 5 at an outer peripheral edge 6 thereof. This makes it possible for the magnetic head 18 to read and write at up to the outer peripheral edge 6 of the magnetic disk 5.

As described above, when the drive is in a non-operating state, the spring 52 acts to dispose the ramp mechanism 30 at essentially the same position as that of a conventional ramp mechanism, and the magnetic head 18 is unloaded onto an outward position of the magnetic disk 5 via the lift tab 20. During operation, however, after the magnetic head 18 has moved from the ramp mechanism 30 to a position above the magnetic disk 5, the ramp mechanism 30 is returned from an outer edge of the magnetic disk 5 by the solenoid 50. The magnetic head 18 can be moved to the outer peripheral edge 6 of the magnetic disk 5 that has formerly been unusable, and as a result, the outer peripheral edge 6 can also be used as a data area. In addition, in case of sudden power supply cutoff such as a power interruption, since supply of power to the solenoid 50 is interrupted, the ramp mechanism 30 is returned to a home position of the ramp by the force of the spring 52. Consequently, the magnetic head 18 can be unloaded onto the ramp mechanism 30, whereby the drive does not suffer damage.

Figure 5:
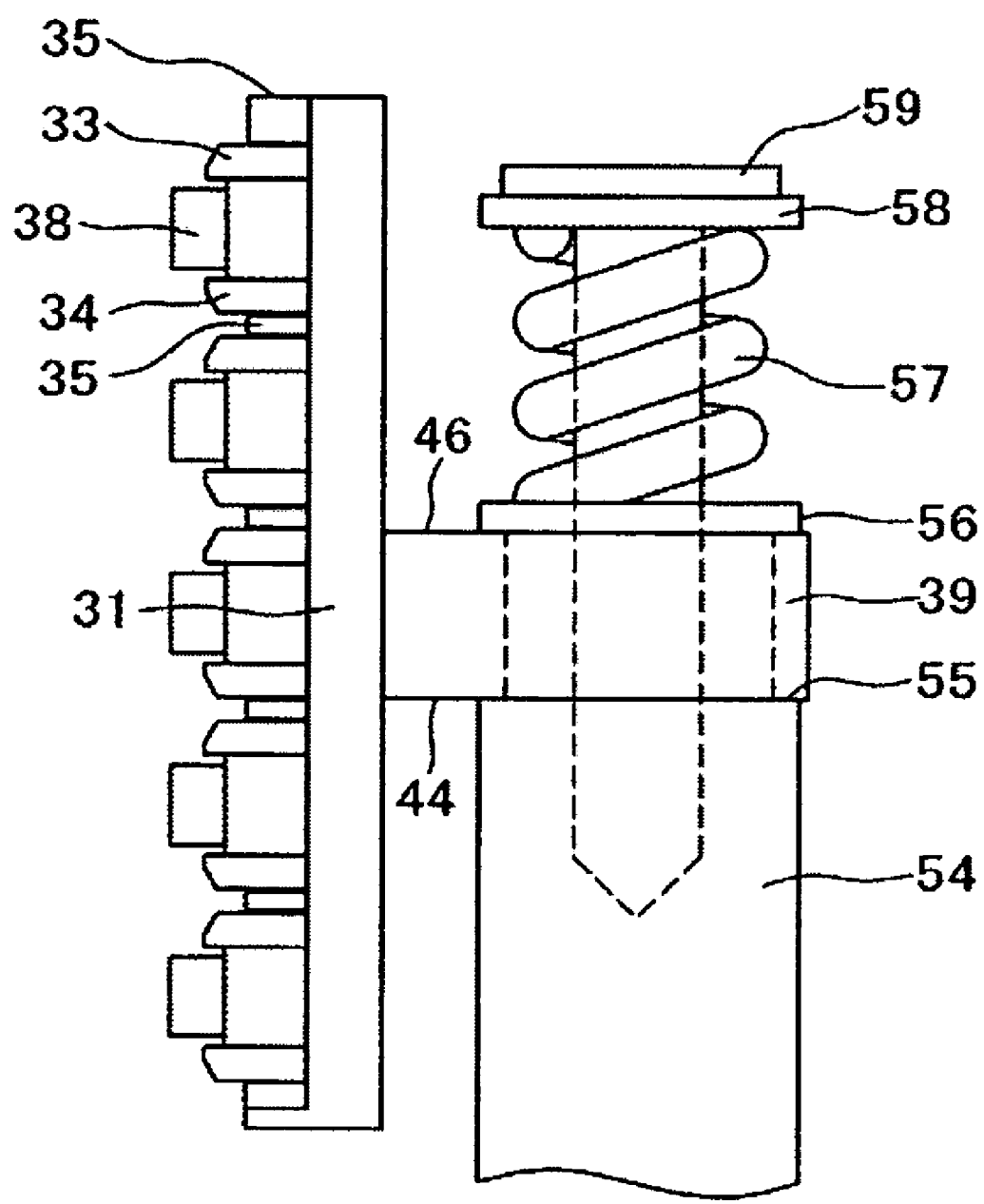
FIG. 5 is a view looking at the ramp mechanism of FIG. 4 from a direction of arrow A.

FIG. 5 is a view looking at the ramp mechanism 30 of FIG. 4 from a direction of arrow A, and shows a mechanism that prevents vertical shifting of the ramp mechanism 30. The protruding section 39 has its lower face 44 engaged with a stepped surface 55 of the guide member 54, and a screw 59 is screwed down into the guide member 54 at an upper face 46 around a guide groove 42 of the protruding section 39, via a washer 56, a spring 57, and a washer 58. Elongation force of the spring 57 is of such a level that it allows the ramp mechanism 30 to turn, and this construction prevents the ramp mechanism 30 from shifting vertically. For the ramp mechanism, a relationship in vertical position between the magnetic head 18 and the magnetic disk 5 is important, and if the relationship in position is disturbed, this results in events such as interference with the magnetic disk 5 and/or a loading failure of the magnetic head 18. However, head-loading reliability is ensured since vertical movement of the ramp mechanism is constrained by the above-mentioned spring 57 and washer 56.

As described above, according to the present invention, a data read/write region on the magnetic disk can be expanded without sacrificing shock resistance, since the ramp mechanism turns. Thus, the increase of storage capacity and improvement of shock resistance that are current market needs can both be satisfied.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A magnetic disk drive comprising:
a base;
a spindle motor secured to said base;
a magnetic disk coupled to said spindle motor;
a carriage mounted on said base;
a suspension supported by said carriage, wherein said suspension has a lift tab at a front end thereof;
a magnetic head mounted on said suspension via a flexure; and
a ramp mechanism pivotally mounted on said base, wherein, when said magnetic head is to be loaded/unloaded, said ramp mechanism moves to a position at which said magnetic head is to be loaded/unloaded, and when read or write operations are to be conducted on said magnetic head, said ramp mechanism moves to an exterior of said magnetic disk, wherein said ramp mechanism has:
a support section;
a first protruding section that protrudes from said support section, wherein said first protruding section includes fins, each of which has, in addition to an inclined surface at a front end extended in a direction of said magnetic disk, an unloading guide surface of the lift tab; and
a constraint plate for the lift tab, wherein the constraint plate protrudes from said support section and faces the unloading guide surface, and
wherein said ramp mechanism further has a second protruding section protruding from said support section and formed with a guide groove which engages with a guide member secured to said base, said second protruding section being pressed firmly against a stepped surface of the guide member.

2. The magnetic disk drive according to claim 1, wherein said magnetic head is disposed at the loading/unloading position thereof by said ramp mechanism and a spring mounted on said base, and said ramp mechanism moves to the exterior of said magnetic disk by force of a driving mechanism mounted on said base.

3. The magnetic disk drive according to claim 2, wherein said driving mechanism comprises a solenoid.

4. The magnetic disk drive according to claim 1, wherein said ramp mechanism further has a second constraint plate to constrain the flexure, the second constraint plate protruding from said support section.

5. A magnetic disk drive comprising:
a base;
a spindle motor secured to said base;
a magnetic disk coupled to said spindle motor;
a carriage mounted on said base;
a suspension supported by said carriage, wherein said suspension has a lift tab at a front end thereof;
a magnetic head mounted on said suspension via a flexure; and
a ramp mechanism pivotally mounted on said base, wherein, when said magnetic head is to be loaded/unloaded, said ramp mechanism moves to a position at which said magnetic head is to be loaded/unloaded, and when read or write operations are to be conducted on said magnetic head, said ramp mechanism moves to an exterior of said magnetic disk;
wherein said magnetic head reads or writes data on an outer peripheral edge of said magnetic disk;
wherein said ramp mechanism has:
a support section;
a first protruding section that protrudes from said support section, wherein said first protruding section includes fins, each of which has, in addition to an inclined surface at a front end extended in a direction of said magnetic disk, an unloading guide surface of the lift tab; and
a constraint plate for the lift tab, wherein the constraint plate protrudes from said support section and faces the unloading guide surface, and
wherein said ramp mechanism further has a second protruding section protruding from said support section and formed with a guide groove which engages with a guide member secured to said base, said second protruding section being pressed firmly against a stepped surface of the guide member.

6. The magnetic disk drive according to claim 5, wherein, if a power interruption occurs during the read or write operations of said magnetic head, said ramp mechanism moves to the position at which said magnetic head is to be loaded/unloaded.

7. The magnetic disk drive according to claim 5, wherein said magnetic head is disposed at the loading/unloading position thereof by said ramp mechanism and a spring mounted on said base, and said ramp mechanism moves to the exterior of said magnetic disk by force of a driving mechanism mounted on said base.

8. The magnetic disk drive according to claim 7, wherein said driving mechanism comprises a solenoid.

9. The magnetic disk drive according to claim 5, wherein said ramp mechanism further has a second constraint plate to constrain the flexure, the second constraint plate protruding from said support section.

10. A magnetic disk drive comprising:
a base;
a spindle motor secured to said base;
a magnetic disk coupled to said spindle motor;
a carriage mounted on said base;
a suspension supported by said carriage, wherein said suspension has a lift tab at a front end;
a magnetic head mounted on said suspension via a flexure; and
a ramp mechanism pivotally mounted on said base, wherein said ramp mechanism is constructed so that said magnetic head moves to a loading/unloading position by an action of a spring mounted on said base at one end, and so that said ramp mechanism moves to an exterior of said magnetic disk by an action of a solenoid mounted on said base;
wherein, after said ramp mechanism has moved to the exterior of said magnetic disk, said magnetic head reads or writes data on said magnetic disk;
wherein said ramp mechanism has:
a support section;
a first protruding section that protrudes from said support section, wherein said first protruding section includes fins, each of which has, in addition to an inclined surface at a front end extended in a direction of said magnetic disk, an unloading guide surface of the lift tab; and a constraint plate for the lift tab, wherein the constraint plate protrudes from said support section and faces the unloading guide surface, and wherein said ramp mechanism further has a second protruding section protruding from said support section and formed with a guide groove which engages with a guide member secured to said base, said second protruding section being pressed firmly against a stepped surface of the guide member.

11. The magnetic disk drive according to claim 10, wherein, if a power interruption occurs during the read or write operations of said magnetic head, said ramp mechanism moves to the loading/unloading position of said magnetic head by the action of the spring.

12. The magnetic disk drive according to claim 10, wherein said ramp mechanism further has a second constraint plate to constrain the flexure, the second constraint plate protruding from said support section.

13. The magnetic disk drive according to claim 10, wherein said magnetic head reads or writes data on an outer peripheral edge of said magnetic disk.

* * * * *

UNITED STATES PATENT AND TRADEMARK OFFICE
CERTIFICATE OF CORRECTION

PATENT NO. : 7,697,238 B2
APPLICATION NO. : 11/479321
DATED : April 13, 2010
INVENTOR(S) : Ohno Makoto et al.

It is certified that error appears in the above-identified patent and that said Letters Patent is hereby corrected as shown below:

On the Title Page Item (54) & Col. 1 lines 1-3 Change title from "MAGNETIC DISK DRIVE WITH LOAD/UNLOAD MECHANISM HAVING FIRST AND SECOND PROTRUSIONS" to --MAGNETIC DISK DRIVE WITH LOAD/UNLOAD MECHANISM GUIDE--

Signed and Sealed this
Thirteenth Day of September, 2011

David J. Kappos
*Director of the United States Patent and Trademark Office*